US009204001B2

(12) United States Patent
Shiomi (10) Patent No.: US 9,204,001 B2
(45) Date of Patent: Dec. 1, 2015

(54) IMAGE READING DEVICE AND MULTIFUNCTION APPARATUS PROVIDED WITH THE SAME

(71) Applicant: Hiroshi Shiomi, Nagoya (JP)

(72) Inventor: Hiroshi Shiomi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 107 days.

(21) Appl. No.: 14/036,062

(22) Filed: Sep. 25, 2013

(65) Prior Publication Data

US 2014/0168680 A1 Jun. 19, 2014

(30) Foreign Application Priority Data

Dec. 14, 2012 (JP) ................................. 2012-273583

(51) Int. Cl.
H04N 1/00 (2006.01)
H04N 1/10 (2006.01)
H04N 1/04 (2006.01)
H04N 1/193 (2006.01)

(52) U.S. Cl.
CPC ....... H04N 1/00907 (2013.01); H04N 1/00551 (2013.01); H04N 1/1013 (2013.01); H04N 1/0464 (2013.01); H04N 1/193 (2013.01); H04N 2201/0081 (2013.01)

(58) Field of Classification Search
None
See application file for complete search history.

(56) References Cited

U.S. PATENT DOCUMENTS

| 7,295,792 B2 | 11/2007 | Ito | |
| 2006/0056875 A1* | 3/2006 | Karasawa et al. | 399/107 |
| 2006/0083542 A1 | 4/2006 | Ito | |
| 2012/0169005 A1* | 7/2012 | Borsuk et al. | 270/58.11 |

FOREIGN PATENT DOCUMENTS

| JP | 08-293937 A | 11/1996 |
| JP | 2006-119236 A | 5/2006 |
| JP | 2009-169078 A | 7/2009 |

* cited by examiner

Primary Examiner — Ashish K Thomas
Assistant Examiner — Keara Harris
(74) Attorney, Agent, or Firm — Banner & Witcoff, Ltd.

(57) ABSTRACT

An image reading device includes: a base member; an outer cover; a top plate member; a carriage; a reading unit; a first drive unit; and a first power supply cable. The base member has a bottom wall, and a peripheral wall defining a moving space in combination with the base member. The outer cover covers the peripheral wall such that the inner surface of the outer cover is opposed to and spaced apart from the outer surface of the peripheral wall. The inner surface and the outer surface define a housing space therebetween. The reading unit reads an image from a medium placed on a platen glass while the carriage is reciprocatingly moved inside the moving space along a moving direction. The first drive unit is supported at the base member and reciprocatingly moves the carriage. The first power supply cable is connected to the first drive unit and accommodated in the housing space.

11 Claims, 8 Drawing Sheets

IMAGE READING DEVICE AND MULTIFUNCTION APPARATUS PROVIDED WITH THE SAME

CROSS REFERENCE TO RELATED APPLICATION

This application claims priority from Japanese Patent Application No. 2012-273583 filed Dec. 14, 2012. The entire content of the priority application is incorporated herein by reference.

TECHNICAL FIELD

The present invention relates to an image reading device, and a multifunction apparatus provided with the image reading device.

BACKGROUND

There is conventionally known a multifunction apparatus including an image reading device, and a main body that supports from below the image reading device and accommodates an image forming section that forms an image onto a sheet. The image reading device includes a base member, a top plate member, a carriage, a reading unit, and a drive unit.

The base member includes a bottom wall and a peripheral wall extending upward from the bottom wall to form a carriage moving space thereinside. The top plate member is supported by an upper edge of the peripheral wall so as to be disposed opposite to and spaced apart from the bottom wall. The top plate member has a platen glass covering the carriage moving space. In the carriage moving space, a carriage is reciprocatingly moved along a scanning direction extending from a base end side to a terminal end side. The reading unit is supported by the carriage so as to face the platen glass in the carriage moving space and reads an image on a reading medium placed on the platen glass while the carriage is being reciprocatingly moved. The drive unit is supported by the base member and reciprocatingly moves the carriage.

In this multifunction apparatus, the base member, the top plate member, the carriage, the reading unit, and the drive unit constitute a flatbed scanner. A cover member is supported at the flatbed scanner such that the position of the cover member can be changed between a position covering an upper surface of the platen glass and a position opening the upper surface of the platen glass. Moreover, an automatic document feeder section is placed on an upper surface of the cover member.

SUMMARY

In recent years, in an image reading device and a multifunction apparatus provided with the image reading device, the number of power supply cables tends to increase as the number of functions to be implemented increases. Accordingly, a dedicated space for routing these power supply cables needs to be ensured, with the result that a size of the image reading device or the multifunction apparatus increases. Moreover, the routing of these power supply cables may adversely affect layout of other components of the device, thus resulting in an increase in the device size. Particularly, the image reading device and the multifunction apparatus includes a component exerting an adverse impact (e.g., noise) on the power supply cables, and thus there is need to route the power supply cables while avoiding such a component.

In view of the foregoing, it is an object of the present invention to provide an image reading device and a multifunction apparatus capable of effectively routing power supply cables without involving an increase in the size of the device.

In order to attain the above and other objects, the present invention provides an image reading device including: a base member; an outer cover; a top plate member; a carriage; a reading unit; a first drive unit; and a first power supply cable. The base member has a bottom wall, and a peripheral wall protruding upward from the bottom wall and defining a moving space in combination with the base member. The peripheral wall has an outer surface. The outer cover has an inner surface. The outer cover covers the peripheral wall such that the inner surface of the outer cover is opposed to and spaced apart from the outer surface of the peripheral wall. The inner surface and the outer surface define a housing space therebetween. The top plate member is supported by the peripheral wall such that the top plate member is opposed to and spaced apart from the bottom wall. The top plate member includes a platen glass covering the moving space. The carriage is configured to be reciprocatingly movable inside the moving space along a moving direction. The reading unit is supported by the carriage to face the platen glass. The reading unit is configured to read an image from a medium to be read placed on the platen glass while the carriage is reciprocatingly moved. The first drive unit is supported at the base member and configured to reciprocatingly move the carriage. The first power supply cable is connected to the first drive unit and accommodated in the housing space.

According to another aspect, the present invention provides a multifunction apparatus including: an image reading device and an image forming device. The image reading device includes: a flatbed scanner section; a carriage; a reading unit; a first drive unit; a first power supply cable; and a cover. The base member has a bottom wall and a peripheral wall protruding upward from the bottom wall and defining a moving space in combination with the base member. The peripheral wall has an outer surface. The outer cover has an inner surface. The outer cover covers the peripheral wall such that the inner surface of the outer cover is opposed to and spaced apart from the outer surface of the peripheral wall. The inner surface and the outer surface defines a housing space therebetween. The top plate member is supported by the peripheral wall such that the top plate member is opposed to and spaced apart from the bottom wall. The top plate member includes a platen glass covering the moving space. The platen glass has an upper surface. The carriage is configured to be reciprocatingly movable inside the moving space along a moving direction. The reading unit is supported by the carriage to face the platen glass. The reading unit is configured to read an image from a medium to be read placed on the platen glass while the carriage is reciprocatingly moved. The first drive unit is supported at the base member and configured to reciprocatingly move the carriage. The first power supply cable is connected to the first drive unit and accommodated in the housing space. The cover is movably supported at the flatbed scanner section and configured to be moved between a cover position for covering the upper surface of the platen glass and an open position for opening the upper surface of the platen glass. The image forming device includes: an image forming section; and a main body. The image forming section is configured to form an image on a medium to be recorded. The main body is accommodating the image forming section therein and supports the image reading device from below. The flatbed scanner section has a size greater than a size of the main body in a horizontal direction. The cover is positioned on a first side relative to the outer cover in a vertical direction. The main body is positioned on a second side relative to the outer cover in the vertical direction. The second side is opposite to the first side in the vertical direction. The outer cover is inclined continuously from the first side to the second side. The peripheral wall has a first end portion positioned on a third side relative to the carriage in the moving direction and a second end portion positioned on a fourth side relative to the carriage in the moving direction. The fourth side is opposite to the third side in the moving direction. The housing space includes at least a first housing space positioned both on the third side and the fourth side. The distance on the first side between the inner surface and the outer surface defining the first housing space is greater than a distance on the second side between the inner surface and the outer surface defining the first housing space.

DETAILED DESCRIPTION

A multifunction apparatus including an image reading device according to one embodiment of the present invention will be described with reference to FIGS. 1 through 9. Throughout the specification, the terms "upward", "downward", "upper", "lower", "above", "below", "beneath", "right", "left", "front", "rear" and the like will be used assuming that the multifunction apparatus 10 is disposed in an orientation in which it is intended to be used. More specifically, an upper-lower direction is defined with reference to an operable state of the multifunction apparatus 10 (i.e. a state illustrated in FIG. 1), a front-rear direction is defined with a side at which an operation panel 25 is provided as a front side, and a left-right direction is defined with reference to the front side of the multifunction apparatus 10.

1. General Structure of Multifunction Apparatus

Figure 1:
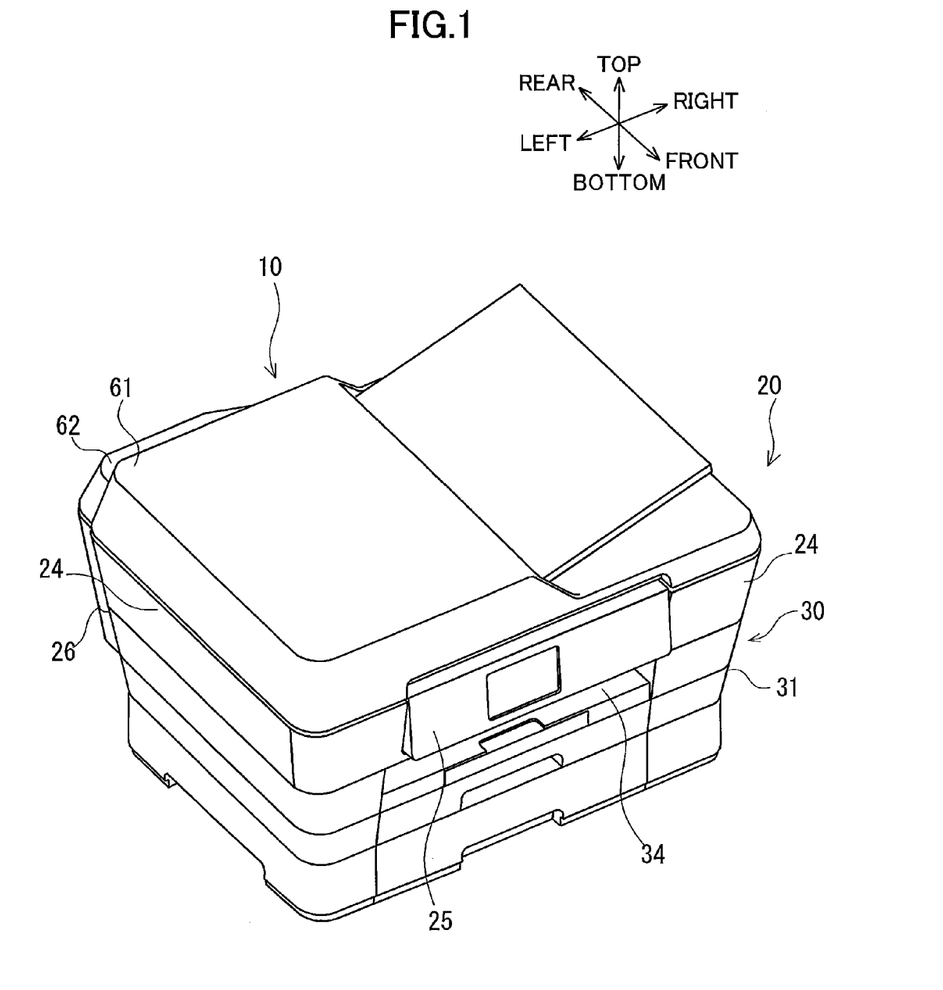
FIG. 1 is a perspective view of a multifunction apparatus provided with an image reading device according to one embodiment of the present invention.

As illustrated in FIG. 1, a multifunction apparatus 10 includes an image reading device 20 and an image forming device 30. The image reading device 20 is configured to read an image on a reading medium (e.g., document) and to generate electronic data of the read image. The image forming device 30 is configured to form an image onto a recording medium (e.g., sheet or OHP sheet). The multifunction apparatus 10 can form an image onto a recording medium, using the image forming device 30, based on electronic data read by the image reading device 20 (copy function), can perform communication processing with an external device to transmit image data read by the image reading device 20 to the external device (FAX transmission function), and can form an image onto a recording medium based on image data received from an external device (FAX reception function).

2. Image Forming Device

Figure 3:
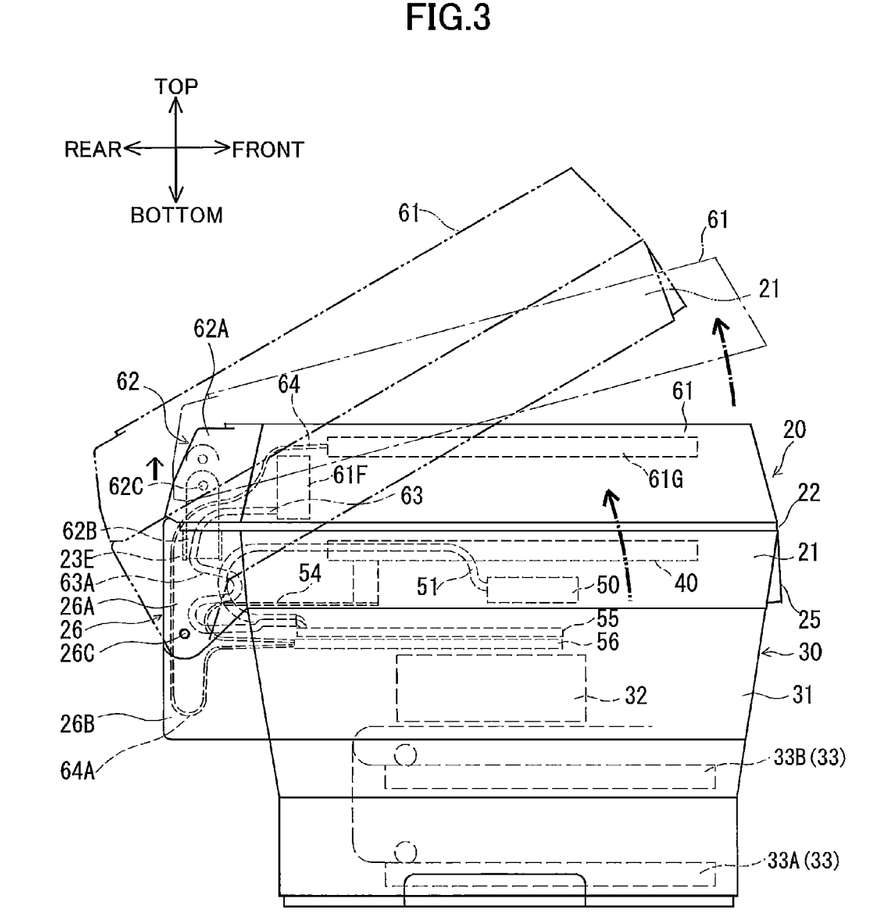
FIG. 3 is a left side view of the multifunction apparatus according to the embodiment.

As illustrated in FIG. 3, the image forming device 30 includes a main body 31 serving as an outer casing of the image forming device 30, and an image forming section 32 accommodated in the main body 31. For example, the image forming section 32 can adopt various known configuration, such as a configuration that makes ink adhere onto a recording medium using an inkjet method and a configuration that makes toner adhere onto a recording medium using an electrophotographic method.

Figure 2:
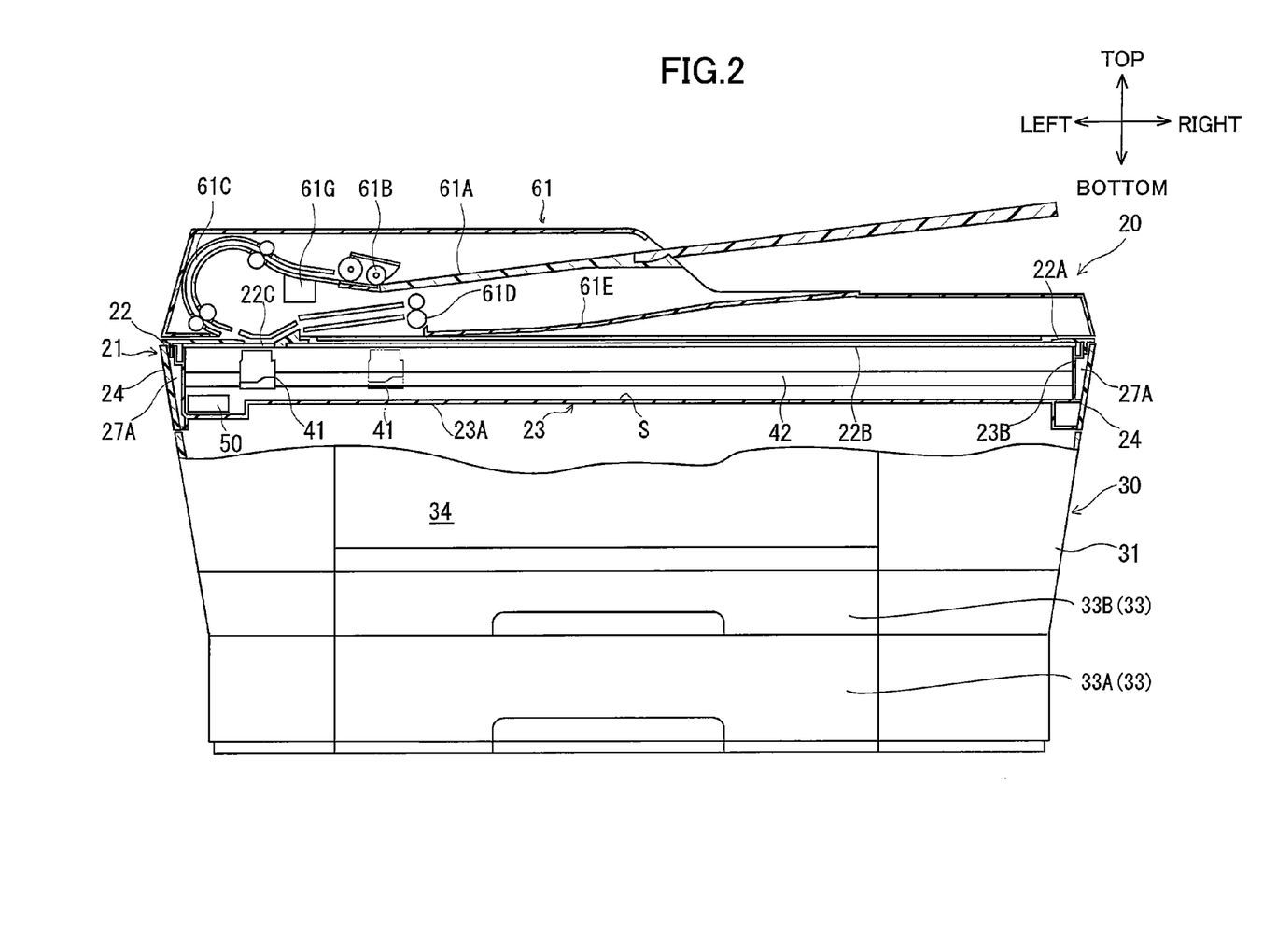
FIG. 2 is a front view of the multifunction apparatus, in which the image reading device according to the embodiment is represented as a cross-sectional view.

As illustrated in FIG. 3, the image forming device 30 further includes sheet cassettes 33 (33A and 33B), each accommodating the recording medium therein. The sheet cassettes 33A and 33B are disposed below the image forming section 32. As illustrated in FIGS. 1 and 2, a discharge port 34 that discharges a recording medium after image formation is opened at a front surface of the main body 31. At a rear surface of the image reading device 20, an opening (not illustrated) is formed between hinge portions 26 and 62 (described later). This opening is openably covered by a cover (not illustrated). When the cover is in an open state, the cover is used as a manual feed tray, and the recording medium is supplied to the image forming section 32 diagonally from above.

3. Image Reading Device

Figure 4:
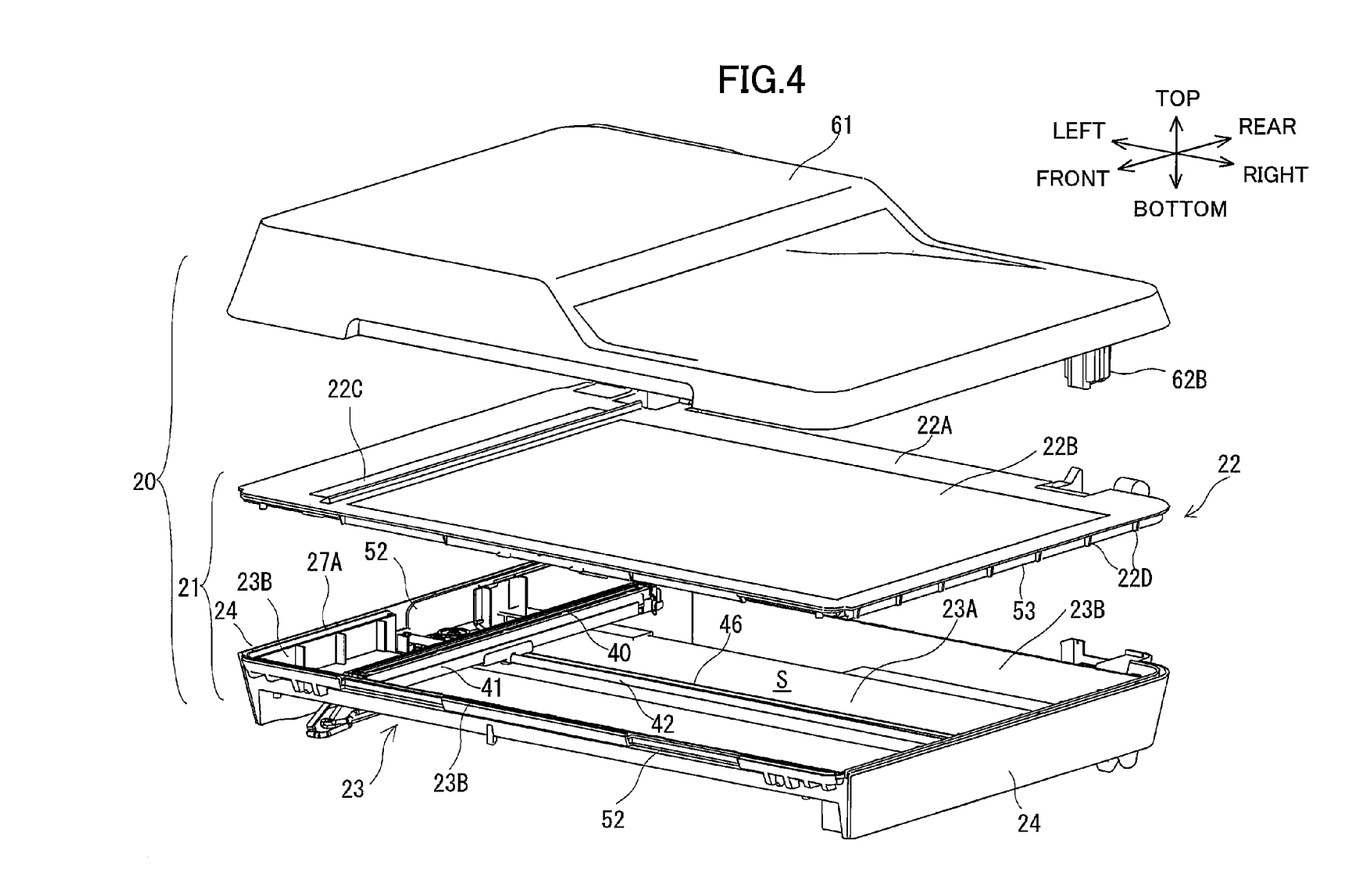
FIG. 4 is an exploded perspective view of the image reading device according to the embodiment.

As illustrated in FIG. 2, the image reading device 20 includes a flatbed scanner section 21 and an automatic document feeder section 61 disposed above the flatbed scanner section 21. A lower surface of the automatic document feeder section 61 serves as a cover for pressing a document placed on the flatbed scanner section 21. As illustrated in FIG. 4, the flatbed scanner section 21 includes a top plate member 22, a box-like shaped base member 23 disposed below the top plate member 22, and a pair of outer covers 24 each surrounding a part of an outer periphery of the base member 23.

Figure 6:
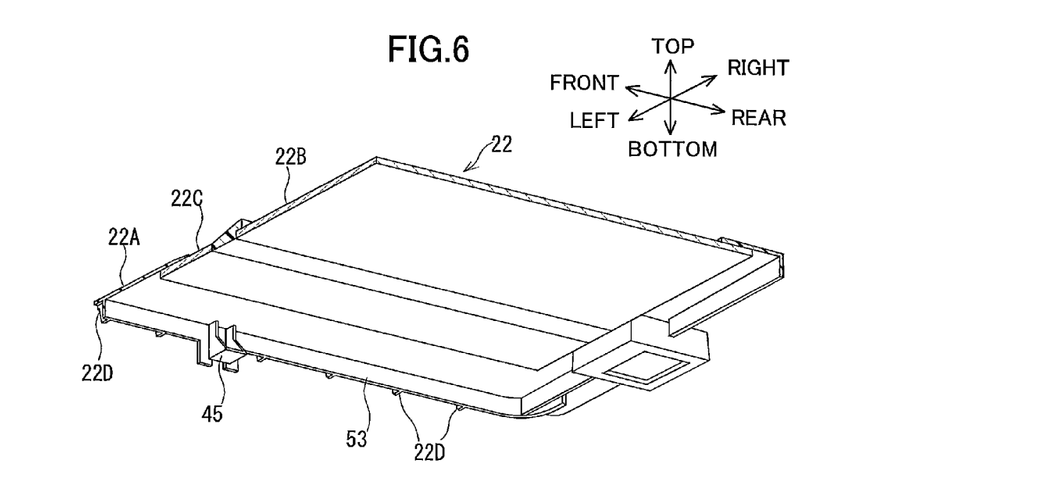
FIG. 6 is a perspective view of a part of a top plate member of the image reading device according to the embodiment as viewed from below.

As illustrated in FIGS. 4 and 6, the top plate member 22 has an outer peripheral frame 22A. Inside the outer peripheral frame 22A, the top plate member 22 supports a platen glass 22B and a reading glass 22C in a fixed manner. The platen glass 22B has a size corresponding to a plane size of a document and supports the document. The reading glass 22C faces a document conveyed by the automatic document feeder section 61. The outer peripheral frame 22A has a plurality of inverted L-shaped ribs 22D protruding downward from a lower surface of an outer peripheral wall thereof. The ribs 22D are formed in plural positions along the outer peripheral wall of the outer peripheral frame 22A. Further, a projecting wall 45 (see FIG. 6) and a protruding wall 53 (see FIG. 4) protrude downward from the outer peripheral frame 22A.

Figure 5:
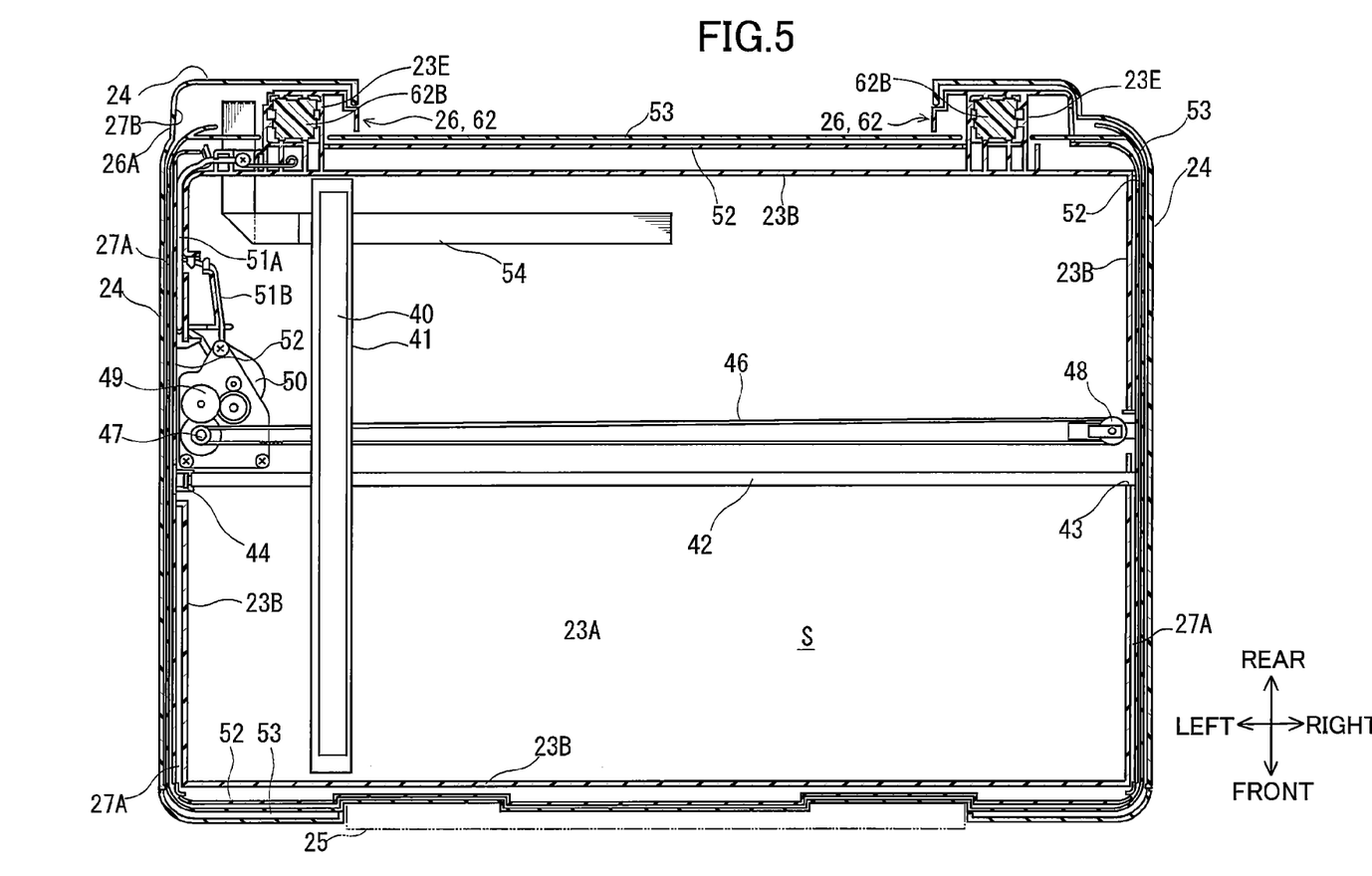
FIG. 5 is a horizontal cross-sectional view of the image reading device according to the embodiment.

As illustrated in FIG. 4, the base member 23 has a bottom wall 23A and a peripheral wall 23B. The bottom wall 23A is slightly smaller in area than the top plate member 22 as viewed from above, and opposed to and spaced apart from the top plate member 22. The peripheral wall 23B extends generally orthogonally away from the bottom wall 23A. That is, the peripheral wall 23B extends upward from an outer periphery of the bottom wall 23A. The peripheral wall 23B has a front peripheral wall, a rear peripheral wall, a left peripheral wall, and a right peripheral wall. As illustrated in FIG. 5, the rear peripheral wall 23B has a cylindrical portion 23E extending vertically. The base member 23 is formed with a carriage moving space S defined by the bottom wall 23A and the peripheral wall 23B. As illustrated in FIG. 5, a carriage 41 is provided in the carriage moving space S and reciprocatingly movable in a left-right direction. Here, a left side and a right side in the carriage moving space S are defined as a based end side and a terminal end side, respectively.

Figure 8:
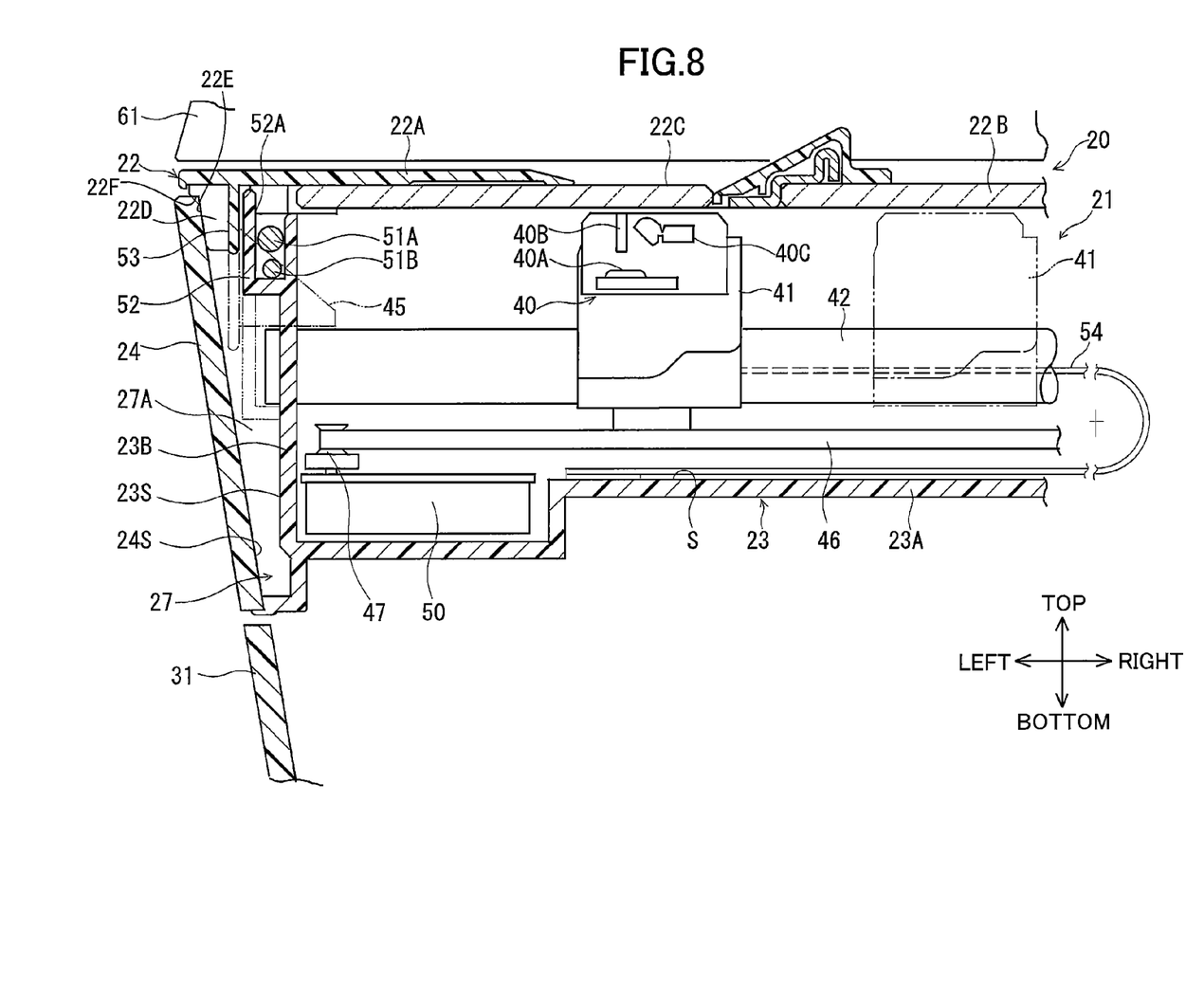
FIG. 8 is an enlarged schematic vertical cross-sectional view of a part of the image reading device according to the embodiment.

As illustrated in FIG. 8, each outer cover 24 is firmly fixed to the base member 23. An inner surface 24S of the outer cover 24 and an outer surface 23S of the peripheral wall 23B are opposed to and spaced apart from each other to form a housing space 27 therebetween. The outer cover 24 has substantially the same height as the peripheral wall 23B in an upper-lower direction. Moreover, as illustrated in FIG. 5, the outer covers 24 extend along a front-rear direction of the left and right peripheral walls 23B as viewed from above and further extend to positions covering the hinge portions 26 and 26 disposed at a rear surface of the rear peripheral wall 23B. Moreover, on the front side of the image reading device 20, the outer cover 24 covers the front peripheral wall 23B except for a portion at which the operation panel 25 is provided. With this configuration, the housing space 27 is constituted by a first housing space 27A positioned at both the base end side and the terminal end side in a moving direction of the carriage 41 and a second housing portion 27B positioned on a side of the hinges 26 and 26.

As illustrated in FIG. 8, the outer peripheral frame 22A of the top plate member 22 has an outer shape substantially corresponding to upper edges of the outer covers 24 as viewed from above. The inverted L-shaped rib 22D has a surface extending in a vertical direction whose outer edge 22E is abuttable against the inner surface 24S of the outer cover 24. The inverted L-shaped rib 22D has a surface extending in the horizontal direction whose lower edge 22F is abuttable against the upper edge of the outer cover 24. With this configuration, the top plate member 22 and the pair of outer covers 24 are subjected to positioning relative to each other to cover the carriage moving space S.

As illustrated in FIGS. 2 and 5, the flatbed scanner section 21 is supported from below by the main body 31 of the image forming device 30 and configured to be pivotally movable about the left and right hinge portions 26 and 26 (see FIG. 1) so as to open and close an upper surface of the main body 31. As illustrated in FIG. 3, the hinge portion 26 includes a protruding portion 26A obtained by making a part of a rear surface of the outer cover 24 protrude rearward, a protruding portion 26B protruding from a rear surface of the main body 31, and a shaft 26C penetrating the protruding portions 26A and 26B. The shaft 26C extends in parallel to the moving direction of the carriage 41. An axial center of the shaft 26C corresponds to a pivot axis of the flatbed scanner section 21. This allows a front end of the flatbed scanner section 21 to pivotally move in the upper-lower direction about an axis of the shaft 26C. When the flatbed scanner section 21 is in an open state, maintenance of an inside of the image forming device 30 can be carried out.

As illustrated in FIG. 2, the platen glass 22B has a size that can support an A3-size document set with a long side thereof oriented in the left-right direction (direction parallel to the moving direction of the carriage 41). The sheet cassettes 33A and 33B of the image forming device 30 each have a size that can accommodate an A4-size sheet set with a long side thereof oriented in the left-right direction. Thus, the image forming section 32 has a left-right width corresponding to the long side of the A4-size sheet. The flatbed scanner section 21 has a size greater than the main body 31 in the horizontal direction. Thus, when the multifunction apparatus 10 is viewed from above, the image forming device 30 is overlapped within the area of the flatbed scanner section 21. As a result, as illustrated in FIGS. 1 through 3, on the front surface and both left and right side surfaces of the multifunction apparatus 10, the pair of outer covers 24 is inclined inward continuously from the upper ends thereof (the automatic document feeder section 61 side) to the lower ends thereof (the main body 31 side).

The main body 31 is made smaller than the flatbed scanner section 21 in the horizontal direction, so that an installation area of the multifunction apparatus 10 can be reduced. The inclined shape is effective for visual reduction in size of the multifunction apparatus 10.

Moreover, as illustrated in FIGS. 2 and 8, the first housing space 27A is formed such that the lower portion thereof has a width narrower than the width of the upper portion thereof. On the other hand, as illustrated in FIGS. 3 and 5, the second housing space 27B is formed to have substantially a uniform width from the upper portion thereof to lower portion thereof.

As illustrated in FIG. 5, the image reading device 20 includes a reading unit 40 supported on an upper surface of the carriage 41. The reading unit 40 is positioned in the carriage moving space S to face the platen glass 22B and configured to read an image from a document placed on the platen glass 22B while the carriage 41 is reciprocatingly moved. More specifically, as illustrated in FIG. 8, the reading unit 40 is provided with a photoelectric conversion element 40A, a lens section 40B, and a light emitting section 40C, and has a known configuration that uses the light emitting section 40C to irradiate a document with light to allow the photoelectric conversion element 40A to convert an image on the document into electronic data through the lens section 40B. The reading unit 40 has a length corresponding to a short side of the platen glass 22B.

The carriage 41 is supported from below by a shaft 42. The shaft 42 is disposed in parallel to a long side direction of the platen glass 22B. As illustrated in FIG. 5, the base member 23 has a horizontally-opened circular through-hole 43 and an upwardly-opened receiving portion 44. The through-hole 43 is formed in the peripheral wall 23B. The shaft 42 is mounted to the base member 23 such that a right end thereof is inserted into the through-hole 43 and a left end thereof is inserted into the receiving portion 44. As illustrated in FIG. 8, the left end of the shaft 42 on the receiving portion 44 side is pressed from above by the protrusion wall 45 of the outer peripheral frame 22A of the top plate member 22.

Figure 7:
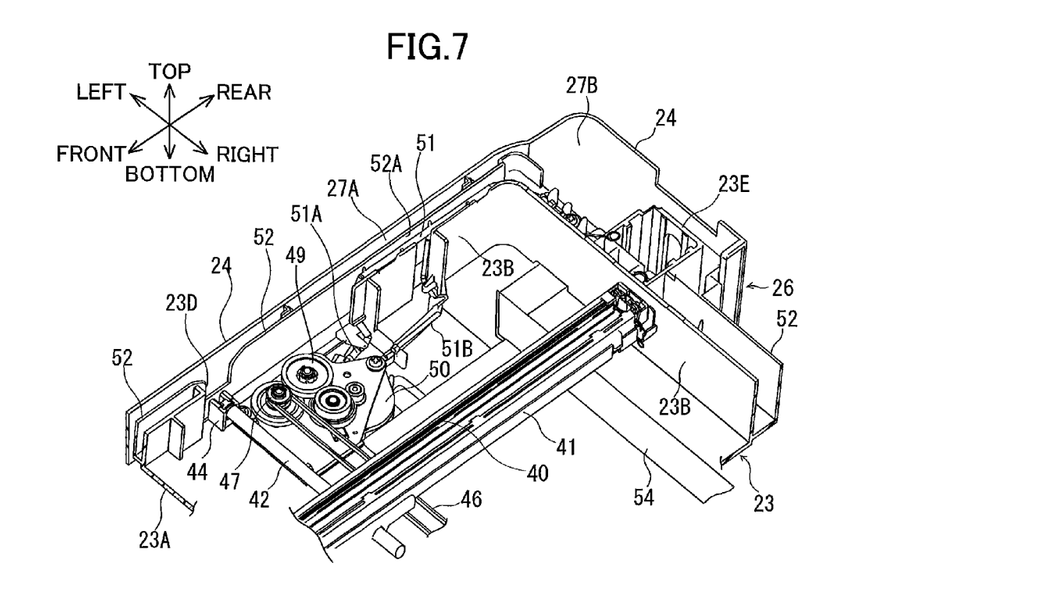
FIG. 7 is a perspective view of a part of a base member of the image reading device according to the embodiment as viewed from above.
Figure 9:
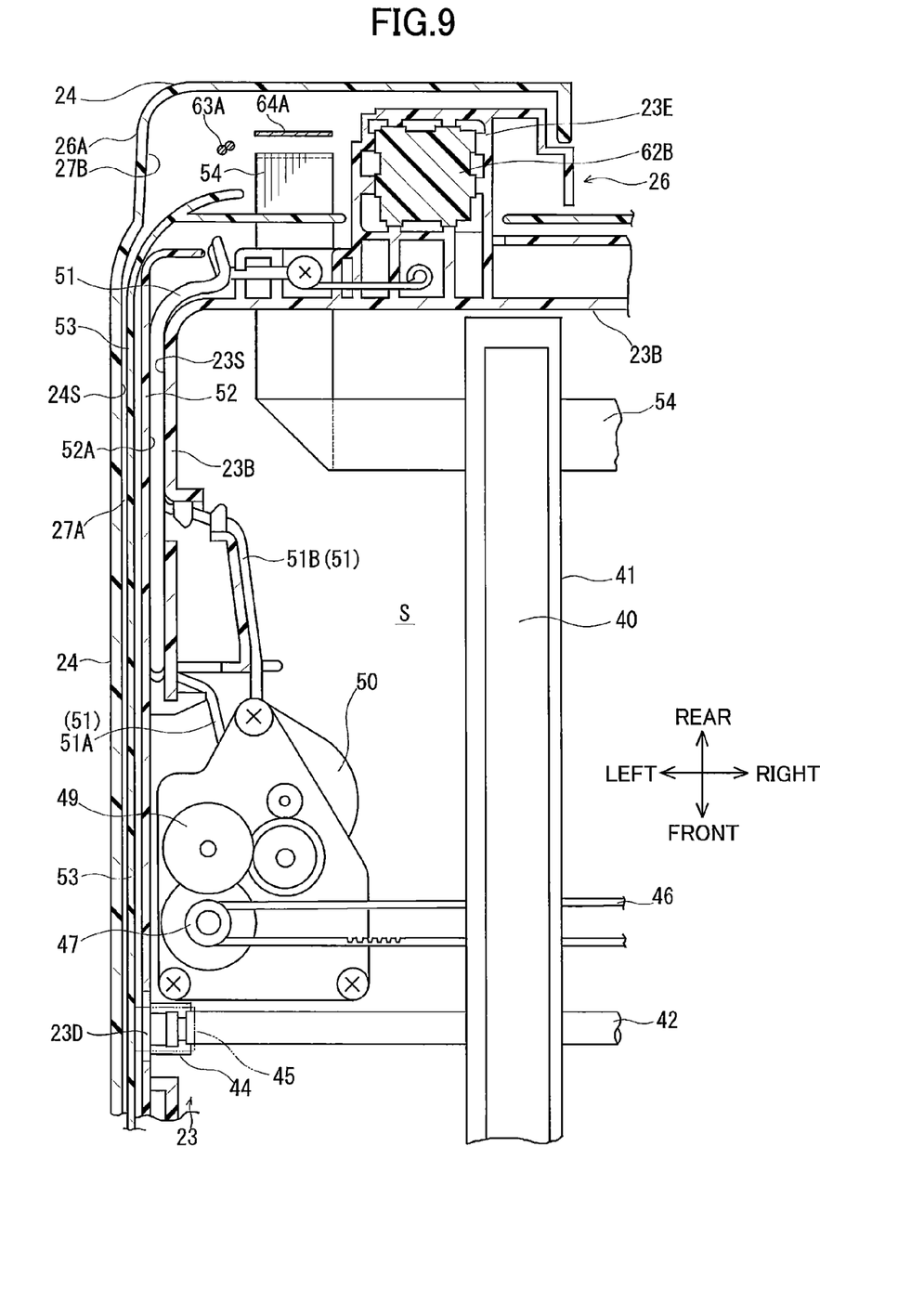
FIG. 9 is an enlarged schematic horizontal cross-sectional view of a part of the image reading device according to the embodiment, the part illustrated herein corresponding to the part illustrated in FIG. 8.

As illustrated in FIGS. 5 and 7, a drive pulley 47 is disposed on one end side of the shaft 42 (i.e. on a left side), and a tension pulley 48 is disposed on the other end side thereof (i.e. on a right side). A toothed timing belt 46 is stretched around the drive pulley 47 and the tension pulley 48. A motor 50 serving as a first drive unit and a decelerating gear 49 for transmitting rotation of the motor 50 to the drive pulley 47 are fixed to the bottom wall 23A at a position near the drive pulley 47. As illustrated in FIGS. 8 and 9, the carriage 41 is connected to the toothed timing belt 46 and, thereby, can be reciprocatingly moved by forward and reverse rotation of the motor 50 along the shaft 42, i.e., in the long side direction of the platen glass 22B. When the automatic document feeder section 61 is used, the carriage 41 is positioned in a stationary manner at a position opposite to the reading glass 22C.

In order to move the reading unit 40 in the moving direction thereof without being inclined in a horizontal plane, it is preferable that the carriage 41 is connected to the toothed timing belt 46 at almost a center of the reading unit 40 in a direction perpendicular to the moving direction. Moreover, in order to make the shaft 42 as long in length as possible within the carriage moving space S while preventing the size of the flat bet scanner section 21 from increasing uselessly, the peripheral wall 23B does not exist at a position where the receiving portion 44 is provided, as illustrated in FIG. 5.

As illustrated in FIG. 9, a first power supply cable 51 is connected to the motor 50. As illustrated in FIG. 5, the first power supply cable 51 includes a connecting wire 51A connected to a substrate 55 (see FIG. 3) in the main body 31 and a ground wire 51B for grounding electrically-conductive components including the motor 50. The connecting wire 51A extends leftward from the motor 50 to penetrate the left peripheral wall 23B at a position near the motor 50, and is disposed in the first housing space 27A between the left peripheral wall 23B and the outer cover 24. The ground wire 51B extends rearward from the motor 50 and then penetrates the left peripheral wall 23B, and is disposed in the first housing space 27A between the left peripheral wall 23B and the outer cover 24.

As illustrated in FIG. 8, the base member 23 further has a partitioning wall 52 having generally an L-shaped cross-section and formed at the peripheral wall 23B. The partitioning wall 52 extends from the peripheral wall 23B in the horizontal direction toward the outer cover 24 and is then bent upward. In the first housing space 27A, the partitioning wall 52 forms a groove 52A with the peripheral wall 23B, and the first power supply cable 51 (both the connecting wire 51A and the ground wire 51B) is supported in the groove 52A.

By virtue of the partitioning wall 52, the first power supply cable 51 can be stably positioned in the first housing space 27A. Moreover, at the time of assembly, existence of the partitioning wall 52 facilitates routing of the first power supply cable 51.

Moreover, as illustrated in FIGS. 7 and 9, a notch 23D is formed in the partitioning wall 52 at an outer side of the receiving portion 44. The notch 23D is covered by the projecting wall 45 formed in the top plate member 22. The notch 23D also helps the shaft 42 to make as long in length as possible within the carriage moving space S while preventing the size of the flat bet scanner section 21 from increasing uselessly.

As illustrated in FIGS. 5 and 9, the partitioning wall 52 is formed over almost the entire periphery of the peripheral wall 23B except for portions near the hinge portions 26 and 26. The first power supply cable 51 extends rearward along the peripheral wall 23B (groove 52A) and is routed downward from the second housing space 27B defined between the rear peripheral wall 23B and the protruding portion 26A of the outer cover 24. Then, as illustrated in FIG. 3, the first power supply cable 51 is routed through the protruding portion 26B of the main body 31 and is connected to the substrate 55 in the main body 31. Such routing distances the first power supply cable 51 from other components, thereby avoiding an adverse impact on the first power supply cable 51 from the other components.

As illustrated in FIG. 9, a flexible flat cable 54 is connected to the reading unit 40. The flexible flat cable 54 penetrates the rear peripheral wall 23B of the base member 23 and is routed downward from the second housing space 27B defined between the rear peripheral wall 23B and the protruding portion 26A of the outer cover 24, like the first power supply cable 51. Then, as illustrated in FIG. 3, the flexible flat cable 54 is routed through the protruding portion 26A of the outer cover 24 and is connected to a substrate 56 in the main body 31. Although the flexible flat cable 54 and the first power supply cable 51 are both disposed in the second housing space 27B, the flexible flat cable 54 and the first power supply cable 51 are spaced apart from each other in the left-right direction so as not to exert adverse affect on each other.

The substrate 55 is provided for controlling the motor 50, and a motor 61F (described later) serving as a second drive unit. The substrate 56 is provided for driving the light emitting section 40C of the reading unit 40 and for processing a signal from the photoelectric conversion element 40A. The substrates 55 and 56 may be formed separately or integrally.

The partitioning wall 52 is formed over almost the entire periphery of the peripheral wall 23B, and also the pair of outer covers 24 is formed substantially along the outside of the partitioning wall 52. Moreover, the outer peripheral frame 22A of the top plate member 22 covers upper edges of the partitioning wall 52, the peripheral wall 23B and the pair of outer covers 24. With this configuration, dust and the like contained in an airflow that is introduced from outside through a gap between the top plate member 22 and the pair of outer covers 24 can be trapped in the first and second housing spaces 27A and 27B and the groove 52A between the partitioning wall 52 and the peripheral wall 23B. As a result, an amount of the dust and the like to be introduced into the carriage moving space S can be reduced to thereby reduce adverse affect on reading quality of the reading unit 40.

As illustrated in FIG. 8, the protruding wall 53 of the outer peripheral frame 22A of the top plate member 22 extends outside the partitioning wall 52 in an overlapping manner therewith in the horizontal direction. The configuration in which the partitioning wall 52 and the protruding wall 53 are disposed opposite to each other can further suppress introduction of dust and the like from outside.

Incidentally, the protruding wall 53 overlapped with the partition wall 52 may be formed inside the partition wall 52.

4. Automatic Document Feeder Section

The automatic document feeder section 61 illustrated in FIG. 1 has a configuration the same as that of a known one. As illustrated in FIG. 2, the automatic document feeder section 61 includes a document supply tray 61A, a supply roller (conveyor) 61B, a discharge roller 61D, and a document discharge tray 61E. The supply roller 61B feeds a document supported on the document supply tray 61A. Then, the document is conveyed through a curved path 61C to a position opposite to the reading glass 22C. Thereafter, the document is discharged onto the document discharge tray 61E by the discharge roller 61D. When the automatic document feeder section 61 is used, the reading unit 40 is stationarily positioned opposite to the reading glass 22C and reads image data on the conveyed document. Another reading unit 61G may be disposed in the automatic document feeder section 61 in order to read a surface opposite to a surface of the document read by the reading unit 40.

As illustrated in FIG. 3, hinge portions 62 and 62 are provided in the automatic document feeder section 61 so as to press a document on the platen glass 22B and to allow the automatic document feeder section 61 to linearly move up and down relative to the flatbed scanner section 21 in accordance with a thickness of the document. The hinge portions 62 and 62 of the automatic document feeder section 61 are positioned above the hinge portions 26 and 26 of the flatbed scanner section 21, respectively.

The hinge portion 62 includes a hollow box-shaped protruding portion 62A and a slide portion 62B. The protruding portion 62A protrudes from a rear surface of the automatic document feeder section 61. The slide portion 62B is pivotally movably supported by a shaft 62C in the protruding portion 62A and also slidably inserted into the cylindrical portion 23E. The shaft 62C extends in parallel to the moving direction of the carriage 41. A front end of the automatic document feeder section 61 is pivotally moved in the upper-lower direction about a pivot axis of the shaft 62C. That is, the position of the automatic document feeder section 61 can be changed between positions that cover and open the upper surface of the platen glass 22B. Moreover, the vertical slide movement of the slide portion 62B allows the automatic document feeder section 61 to change in vertical position in accordance with the document thickness.

As illustrated in FIG. 3, the automatic document feeder section 61 is provided with the motor 61F for driving the supply roller 61B and the discharge roller 61D. The motor 61F is connected with a second power supply cable 63. The second power supply cable 63 includes a bent portion 63A bent in the second housing space 27 so as to follow the vertical movement of the automatic document feeder section 61 performed in accordance with the document thickness. The second power supply cable 63 including the bent portion 63A is routed downward in the protruding portion 62A of the hinge portion 62. Moreover, as illustrated in FIG. 5, the second power supply cable 63 including the bent portion 63A is, like the flexible flat cable 54, routed downward in the second housing space 27B of the hinge portion 26. Then, as illustrated in FIG. 3, the second power supply cable 63 is connected to the substrate 55 in the main body 31. Like the first power supply cable 51, the second power supply cable 63 includes a connecting wire (not illustrated) connected to the motor 61F and a ground wire (not illustrated) for grounding electrically-conductive components including the motor 61F.

Since the bent portion 63A can be accommodated in the second housing space 27B, there is no necessity to ensure a dedicated space for accommodating the bent portion 63A.

In case the reading unit 61G is provided in the automatic document feeder section 61, a flexible flat cable 64 is connected to the reading unit 61G. As illustrated in FIG. 3, the flexible flat cable 64 includes a bent portion 64A bent in a U-shape in the hinge portion 26 so as to follow the vertical movement of the automatic document feeder section 61 performed in accordance with the document thickness. Like the second power supply cable 63, the flexible flat cable 64 including the bent portion 64A is routed through the protruding portion 62A of the hinge portion 62 and is, like the flexible flat cable 54, routed through the second housing space 27B to be connected to the substrate 56.

<Operations and Effects>

In the multifunction apparatus 10 according to the embodiment, the pair of outer covers 24 of the flatbed scanner section 21 extends continuously from the main body 31 of the image forming device 30 while being inclined outward. Thus, the first housing space 27A spread outward toward the above is formed between the inner surfaces 24S of the outer covers 24 and the outer surfaces 23S of both the left and right peripheral walls 23B of the base member 23 of the flatbed scanner section 21. The first power supply cable 51 (the connecting wire 51A and the ground wire 51B) extending from the motor 50 for moving the carriage 41 is accommodated in the first housing space 27A. This eliminates the necessity to ensure a dedicated space for the first power supply cable 51, thereby suppressing an increase in size of the device. Moreover, the first power supply cable 51 can be distanced from other components, thereby reducing an adverse impact, such as noise, on the power supply cable 51.

Moreover, in the multifunction apparatus 10 according to the embodiment, the second power supply cable 63 extending from the motor 61F of the automatic document feeder section 61 that is disposed on the flatbed scanner section 21 is routed to the second housing space 27B provided on the rear side of the flatbed scanner section 21. This eliminates the necessity to ensure a dedicated space for the second power supply cable 63, and therefore, can further suppress the increase in size of the apparatus. Moreover, with respect also to the second power supply cable 63, an adverse impact, such as noise, can be reduced.

Thus, according to the multifunction apparatus 10, the first and second power supply cables 51, 63 can effectively be routed without involving an increase in size.

Moreover, in the multifunction apparatus 10 according to the embodiment, the partitioning wall 52 is provided so as to extend from the peripheral wall 23B to the first housing space 27A. Hence, the partitioning wall 52 serves to support the first power supply cable 51. The partitioning wall 52 is made to extend to a portion not involved in the routing of the first power supply cable 51. Moreover, the protruding wall 53 is formed so as to protrude from the top plate member 22 and to face the partitioning wall 52 of the base member 23. This suppresses the dust and the like from being introduced from outside into the carriage moving space S, thereby reducing adverse affect on reading quality of the reading unit 40.

<Modifications>

While the present invention has been described in detail with reference to the embodiments thereof, it would be apparent to those skilled in the art that various changes and modifications may be made therein without departing from the spirit of the present invention.

For example, although descriptions have been made of the multifunction apparatus including the image forming device and the image reading device in the above embodiment, the present invention may be applied to a stand-alone image reading device. Moreover, a type of the cable routed in the first and second housing spaces 27A and 27B is not limited to that described in the above embodiment.

The present invention is available for an image reading device and a multifunction apparatus.

What is claimed is:

1. An image reading device comprising:
a base member having a bottom wall, and a peripheral wall protruding upward from the bottom wall and defining a moving space in combination with the base member, the peripheral wall having an outer surface;
an outer cover having an inner surface, the outer cover covering the peripheral wall such that the inner surface of the outer cover is opposed to and spaced apart from the outer surface of the peripheral wall, the inner surface and the outer surface defining a housing space therebetween;
a top plate member supported by the peripheral wall such that the top plate member is opposed to and spaced apart from the bottom wall, the top plate member including a platen glass covering the moving space;
a carriage configured to be reciprocatingly movable inside the moving space along a moving direction;
a reading unit supported by the carriage to face the platen glass, the reading unit being configured to read an image from a medium to be read placed on the platen glass while the carriage is reciprocatingly moved;
a first drive unit supported at the base member and configured to reciprocatingly move the carriage; and
a first power supply cable connected to the first drive unit and accommodated in the housing space;
wherein the peripheral wall has a first end portion positioned on a first side relative to the carriage in the moving direction and a second end portion positioned on a second side relative to the carriage in the moving direction, the second side being opposite to the first side in the moving direction;

wherein the housing space comprises at least a first housing space, the first housing space being positioned both on the first side and the second side, and wherein the first power supply cable is accommodated in the first housing space.

2. The image reading device as claimed in claim 1, wherein the base member, the top plate member and the outer cover constitute a flatbed scanner section, the platen glass having an upper surface, and the image reading device further comprising:
a cover movably supported at the flatbed scanner section and configured to be moved between a cover position for covering the upper surface of the platen glass and an open position for opening the upper surface of the platen glass, the cover comprising:
a conveyor configured to convey a medium to be read to allow the reading unit to read an image from the medium to be read; and
a second drive unit configured to drive the conveyor, and
a second power supply cable connected to the second drive unit and accommodated in the housing space.

3. The image reading device as claimed in claim 2, wherein the cover is further configured to be linearly moved in a vertical direction in accordance with a thickness of a medium to be read placed on the upper surface of the platen glass, and
wherein the second power supply cable has a bent portion bendable to follow the linear vertical movement of the cover, the bent portion being accommodated in the housing space.

4. The image reading device as claimed in claim 2, wherein the cover defines an axis extending in parallel to the moving direction, the cover being configured to be pivotally moved about the axis between the cover position and the open position,
wherein the peripheral wall further has a third end portion positioned on a third side relative to the carriage in a perpendicular direction perpendicular to the moving direction and the vertical direction, the axis being positioned on the third side relative to the carriage in the perpendicular direction,
wherein the housing space further comprises a second housing space, the second housing space being positioned on the third side, and
wherein the second power supply cable is accommodated in the second housing space.

5. The image reading device as claimed in claim 1, wherein the base member further has a partitioning wall partitioning the housing space, the partitioning wall extending from the peripheral wall toward the outer cover, and
wherein the first power supply cable is supported by the partitioning wall.

6. The image reading device as claimed in claim 5, wherein the partitioning wall has an L-shaped vertical cross-section, extending horizontally from the peripheral wall and then bending upward.

7. The image reading device as claimed in claim 5, wherein the top plate member has a protruding wall protrudes downward toward the housing space, the protruding wall being overlapped with the partitioning wall as viewed in a horizontal direction.

8. The image reading device as claimed in claim 6, wherein the partitioning wall surrounds the peripheral wall.

9. A multifunction apparatus comprising:
an image reading device comprising:
a flatbed scanner section comprising:
a base member having a bottom wall, and a peripheral wall protruding upward from the bottom wall and defining a moving space in combination with the base member, the peripheral wall having an outer surface;
an outer cover having an inner surface, the outer cover covering the peripheral wall such that the inner surface of the outer cover is opposed to and spaced apart from the outer surface of the peripheral wall, the inner surface and the outer surface defining a housing space therebetween; and
a top plate member supported by the peripheral wall such that the top plate member is opposed to and spaced apart from the bottom wall, the top plate member including a platen glass covering the moving space, the platen glass having an upper surface;
a carriage configured to be reciprocatingly movable inside the moving space along a moving direction;
a reading unit supported by the carriage to face the platen glass, the reading unit being configured to read an image from a medium to be read placed on the platen glass while the carriage is reciprocatingly moved;
a first drive unit supported at the base member and configured to reciprocatingly move the carriage;
a first power supply cable connected to the first drive unit and accommodated in the housing space; and
a cover movably supported at the flatbed scanner section and configured to be moved between a cover position for covering the upper surface of the platen glass and an open position for opening the upper surface of the platen glass, and
an image forming device comprising:
an image forming section configured to form an image on a medium to be recorded; and
a main body accommodating the image forming section therein and supporting the image reading device from below,
wherein the flatbed scanner section has a size greater than a size of the main body in a horizontal direction, the cover being positioned on a first side relative to the outer cover in a vertical direction, the main body being positioned on a second side relative to the outer cover in the vertical direction, the second side being opposite to the first side in the vertical direction, the outer cover being inclined continuously from the first side to the second side,
wherein the peripheral wall has a first end portion positioned on a third side relative to the carriage in the moving direction and a second end portion positioned on a fourth side relative to the carriage in the moving direction, the fourth side being opposite to the third side in the moving direction, and
wherein the housing space comprises at least a first housing space positioned both on the third side and the fourth side, a distance on the first side between the inner surface and the outer surface defining the first housing space being greater than a distance on the second side between the inner surface and the outer surface defining the first housing space.

10. The multifunction apparatus as claimed in claim 9, wherein the main body comprises a substrate configured to control the first drive unit, and
wherein the first power supply cable comprises a connecting wire connecting the substrate to the first drive unit, and a ground wire grounding the first drive unit.

11. The multifunction apparatus as claimed in claim 9, wherein the main body has an upper surface,
wherein the flatbed scanner section defines an axis extending in parallel to the moving direction, the image reading device being supported at the main body such that the flatbed scanner section is movable about the axis between a cover position for covering the upper surface of the main body and an open position for opening the upper surface of the main body, wherein the peripheral wall further has a third end portion positioned on a fifth side relative to the carriage in a perpendicular direction perpendicular to the moving direction and the vertical direction, the axis being positioned on the fifth side relative to the carriage in the perpendicular direction, wherein the housing space further comprises a second housing space spatially continuous with the first housing space, the second housing space being positioned on the fifth side, and wherein the first power supply cable extends from the first housing space positioned on the third side to the main body through the second housing space.

* * * * *